United States Patent
Abe et al.

(10) Patent No.: US 10,712,966 B2
(45) Date of Patent: Jul. 14, 2020

(54) STORAGE CONTROL DEVICE

(71) Applicant: FUJITSU LIMITED, Kawasaki-shi, Kanagawa (JP)

(72) Inventors: Keima Abe, Kawasaki (JP); Takuro Kumabe, Kawasaki (JP); Akihito Kobayashi, Kawasaki (JP); Motohiro Sakai, Nerima (JP)

(73) Assignee: FUJITSU LIMITED, Kawasaki (JP)

( * ) Notice: Subject to any disclaimer, the term of this patent is extended or adjusted under 35 U.S.C. 154(b) by 33 days.

(21) Appl. No.: 16/023,920

(22) Filed: Jun. 29, 2018

(65) Prior Publication Data

US 2019/0018609 A1    Jan. 17, 2019

(30) Foreign Application Priority Data

Jul. 12, 2017  (JP) ................. 2017-136182

(51) Int. Cl.
| | |
|---|---|
| *G06F 3/06* | (2006.01) |
| *G06F 12/0871* | (2016.01) |
| *G06F 12/02* | (2006.01) |
| *G06F 12/0802* | (2016.01) |
| *G06F 12/0873* | (2016.01) |

(52) U.S. Cl.
CPC ............ *G06F 3/0647* (2013.01); *G06F 3/064* (2013.01); *G06F 3/0608* (2013.01); *G06F 3/0644* (2013.01); *G06F 3/0673* (2013.01); *G06F 12/023* (2013.01); *G06F 12/0802* (2013.01); *G06F 12/0871* (2013.01); *G06F 12/0873* (2013.01); *G06F 2212/1044* (2013.01); *G06F 2212/312* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 2011/0125977 A1* | 5/2011 | Karr ...................... | G06F 3/0605 711/162 |
| 2015/0199138 A1* | 7/2015 | Ramachandran ..... | G06F 12/122 711/103 |
| 2015/0277765 A1 | 10/2015 | Watanabe et al. | |
| 2016/0259580 A1* | 9/2016 | Maeda .................. | G06F 3/0619 |
| 2017/0192997 A1* | 7/2017 | Sergeev .............. | G06F 16/1727 |

FOREIGN PATENT DOCUMENTS

| | | |
|---|---|---|
| JP | 2000-82011 | 3/2000 |
| WO | 2015/056332 | 4/2015 |

* cited by examiner

*Primary Examiner* — Michael Alsip
(74) *Attorney, Agent, or Firm* — Fujitsu Patent Center

(57) ABSTRACT

A storage control device includes a processor configured to receive access information indicating a start position and an end position of an access area in a first volume. The processor is configured to determine, based on one or more pieces of the received access information, whether a number of blocks in a cache area is reduced as a whole by changing a position of data in the first volume. The blocks are used in response to an access to the access area and correspond to one or more unit areas in the first volume. The one or more unit areas include the access area. The processor is configured to change the position of the data in the first volume upon determining that the number of the blocks in the cache area is reduced as a whole by changing the position of the data in the first volume.

10 Claims, 10 Drawing Sheets

STORAGE CONTROL DEVICE

CROSS-REFERENCE TO RELATED APPLICATION

This application is based upon and claims the benefit of priority of the prior Japanese Patent Application No. 2017-136182, filed on Jul. 12, 2017, the entire contents of which are incorporated herein by reference.

FIELD

The embodiments discussed herein are related to a storage control device.

BACKGROUND

In a storage device, for example, a logical volume is divided into unit areas for each 128 logical block addressing (LBA), a cache area is divided into blocks for each 128 LBA, and a cache bundle element (CBE) which manages the block in the cache area is prepared. When there is an access to the logical volume from a higher rank device, the CBE is allocated for each unit area in the logical volume including an access destination area and the block in the cache area is associated with the CBE.

In the related art, for example, a direct memory access unit accesses a cache memory to determine a cache hit or cache miss while a processor stops. In addition, for example, there is technology in which each processor package has an ownership of each logical device and divides an input/output command from a host device that designates an address spanning a division position in one logical device to share input/output processing in a plurality of processor packages.

Related techniques are disclosed in, for example, Japanese Laid-Open Patent Publication No. 2000-082011 and International Publication Pamphlet No. WO 2015/056332.

SUMMARY

According to an aspect of the present invention, provided is a storage control device including a memory and a processor coupled to the memory. The processor is configured to receive access information indicating a start position and an end position of an access area in a first volume. The access area is accessed from a higher rank device. The processor is configured to determine, based on one or more pieces of the received access information, whether a number of blocks in a cache area is reduced as a whole by changing a position of data in the first volume. The blocks are used in response to an access to the access area and correspond to one or more unit areas in the first volume. The one or more unit areas include the access area. The processor is configured to change the position of the data in the first volume upon determining that the number of the blocks in the cache area is reduced as a whole by changing the position of the data in the first volume.

The object and advantages of the disclosure will be realized and attained by means of the elements and combinations particularly pointed out in the claims. It is to be understood that both the foregoing general description and the following detailed description are exemplary and explanatory and are not restrictive of the disclosure, as claimed.

DESCRIPTION OF EMBODIMENTS

In the related art, the blocks in the cache area associated with the unit area in the logical volume are likely to be exhausted. For example, in a case where the access destination area is smaller than the size of one unit area in the logical volume, but extends over two unit areas, two CBEs are allocated to the two unit areas and two blocks are associated with the CBEs.

Hereinafter, embodiments of a storage control device and a storage control program according to the present disclosure will be described in detail with reference to the drawings.

(One Example of Storage Control Method According to Embodiment)

Figure 1:
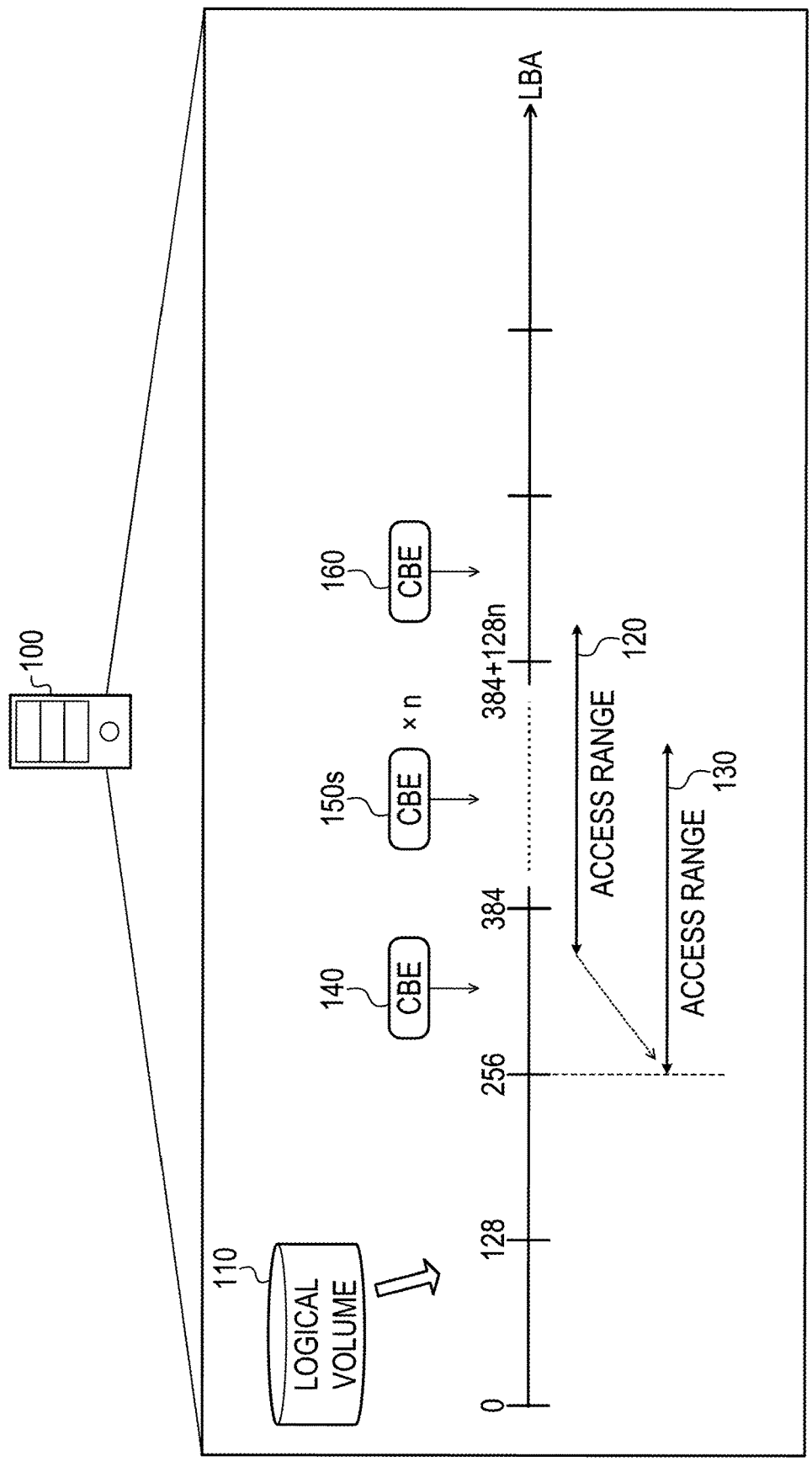
FIG. 1 is an explanatory diagram illustrating an embodiment of a storage control method according to an embodiment.

FIG. 1 is an explanatory diagram illustrating an example of a storage control method according to an embodiment. The storage control device 100 is a computer that controls an access to a logical volume 110 and controls a correspondence between the logical volume 110 and a cache area. The cache area may be accessed faster than the logical volume 110.

The storage control device 100 is, for example, a storage device, a server, or a personal computer (PC). The access is input/output (I/O) of data. For example, the access is requested from a higher rank device. The higher rank device is, for example, a host device. The higher rank device is, specifically for example, the server or the personal computer (PC).

Herein, the cache area may be managed by being divided into blocks each having a predetermined length. For example, the cache area is managed by being divided into the blocks every 128 LBA. A CBE is prepared for each block in the cache area. The CBE is managed by a least recently used (LRU) link.

Meanwhile, the logical volume 110 may be managed by being divided into unit areas of a predetermined length. For example, the logical volume 110 is managed by being divided into unit areas every 128 LBA. A head position of each unit area may indicate a boundary position between the unit areas in the logical volume 110 and may be called a boundary. In the following description, the head position of the unit area may be referred to as "boundary."

When there is an access to the logical volume 110 from the higher rank device, the CBE is allocated for each unit area in the logical volume 110 including an access destination area, the block in the cache area is associated with the CBE, and the block in the cache area is secured. Therefore, the number of blocks in the cache area secured according to the access from the higher rank device may increase.

As a result, the block in the cache area associated with the unit area in the logical volume 110 is likely to be exhausted. For example, when the higher rank device accesses areas of LBAs 254 to 264 in the logical volume 110, two CBEs are allocated to two unit areas of LBAs 128 to 384 in the logical volume 110 and two blocks in the cache area are associated with the CBEs. As described above, in a case where the access destination area is smaller than the size of one unit area in the logical volume 110, but extends over two unit areas, two CBEs are allocated to two unit areas and two blocks in the cache area are actually secured.

Further, waiting for access is likely to occur, which tends to cause deterioration in access performance. For example, while write-back (WriteBack) is being performed on a part within a range of the LBA managed by any one CBE, the access to another part within the same range is handled exclusively, so that the waiting for the access occurs. Therefore, as the number of blocks in the cache area secured in accordance with the access from the host device increases, the waiting for the access is more likely to occur.

Therefore, in the embodiment, descriptions will be made on a storage control method that learns a tendency of the access to the logical volume 110 and determines whether the number of blocks in the cache area, which are used in accordance with the access to the logical volume 110 in the future, is able to be reduced. In the storage control method, when it is determined that the number of blocks is able to be reduced, the position of data in the logical volume 110 is changed so that the number of blocks in the cache area, which are used in accordance with the access to the logical volume 110 in the future, is reduced.

In the example of FIG. 1, (1-1) the storage control device 100 receives information indicating a start position and an end position of the access to the logical volume 110 from the higher rank device. The information indicating the start position and the end position of the access is information indicating the start position of the access by the start LBA and the end position of the access by the number of LBAs from the start LBA to the last LBA. Specifically, the information indicating the start position and the end position of the access is an I/O request. For example, the storage control device 100 receives the I/O request from the host device.

(1-2) The storage control device 100 determines whether the number of blocks in the cache area, which are used in accordance with the access to the logical volume 110, is reduced by a change in data position of the logical volume 110 based on the received one or more pieces of information. The block in the cache area used in accordance with the access to the logical volume 110 is a block associated with each unit area of one or more unit areas in the logical volume 110 including the access destination area which is designated by the higher rank device.

Herein, a case where an I/O request range from the start LBA to the last LBA indicated by any one I/O request is range 120 is described. In this case, the last LBA in range 120 spans the boundary in LBA (384+128n). Therefore, CBE 140, n CBEs 150s, and CBE 160 are allocated to range 120 and n+2 blocks in the cache area are used.

Meanwhile, it is conceivable to move the data in range 120 from range 120 to range 130 so that the head position of the data in range 120 coincides with the boundary in the LBA 256. In this case, the last LBA in range 130 spans the boundary in the LBA (384+128n). Therefore, when the CBE is reallocated, the CBE 140 and the n CBEs 150s are allocated to range 130, and n+1 blocks in the cache area are used.

For example, when the position of the data in the logical volume 110 is changed, the storage control device 100 receives the I/O request indicating range 130, which may use a relatively small number of blocks, in place of the I/O request indicating range 120 in the future. Therefore, when receiving the I/O request indicating range 120 in the past, the storage control device 100 determines that the reduction in the number of blocks in the cache area to be used in the future may be attempted by changing the position of the data in the logical volume 110.

(1-3) When the storage control device 100 determines that the number of blocks is reduced, the storage control device 100 changes the position of the data in the logical volume 110. For example, the storage control device 100 changes the position of the data in the logical volume 110 so that the head position of the data in range 120 coincides with the boundary in the LBA 256.

The storage control device 100 may set a head area or a tail area in the logical volume 110 as an area for storing null data in preparation for changing the position of the data in the logical volume 110. Meanwhile, when the storage control device 100 determines that the number of blocks is not reduced, the storage control device 100 does not change the position of the data in the logical volume 110.

Therefore, the storage control device 100 may reduce the number of blocks in the cache area secured in accordance with the access from the higher rank device. As a result, the storage control device 100 may make it difficult for the blocks in the cache area associated with the unit area in the logical volume 110 to be exhausted.

The storage control device 100 may make it difficult for the waiting for the access to occur, thereby suppressing the deterioration in access performance. Further, since the storage control device 100 attempts to reduce the number of blocks in the cache area used in response to the future I/O request, the storage control device 100 may make it easy to efficiently execute the future I/O.

Herein, the case where the storage control device 100 changes the position of the data of the logical volume 110 is described, but the present disclosure is not limited thereto. For example, the storage control device 100 may change the position of the data of a group of redundant arrays of inexpensive disks (RAID). For example, the storage control device 100 may change the position of the data of a physical volume.

After changing the position of the data in the logical volume 110, the storage control device 100 may reflect the data stored in the block in the cache area onto the logical volume 110 or delete the data. For example, after changing the position of the data in the logical volume 110, when there is data of which write-back is not completed in the block in the cache area, the storage control device 100 may reflect the data onto the logical volume 110. For example, after changing the position of the data in the logical volume 110, when there is data of which write-back is completed in the block in the cache area, the storage control device 100 may delete the data.

For example, before changing the position of the data in the logical volume 110, when there is the data of which write-back is not completed in the block in the cache area, the storage control device 100 may reflect the data onto the logical volume 110. In addition, the storage control device 100 changes the position of the data in the logical volume 110 after reflection.

(Hardware Configuration Example of Storage Control Device 100)

Next, a hardware configuration example of the storage control device 100 will be described with reference to FIG. 2.

Figure 2:
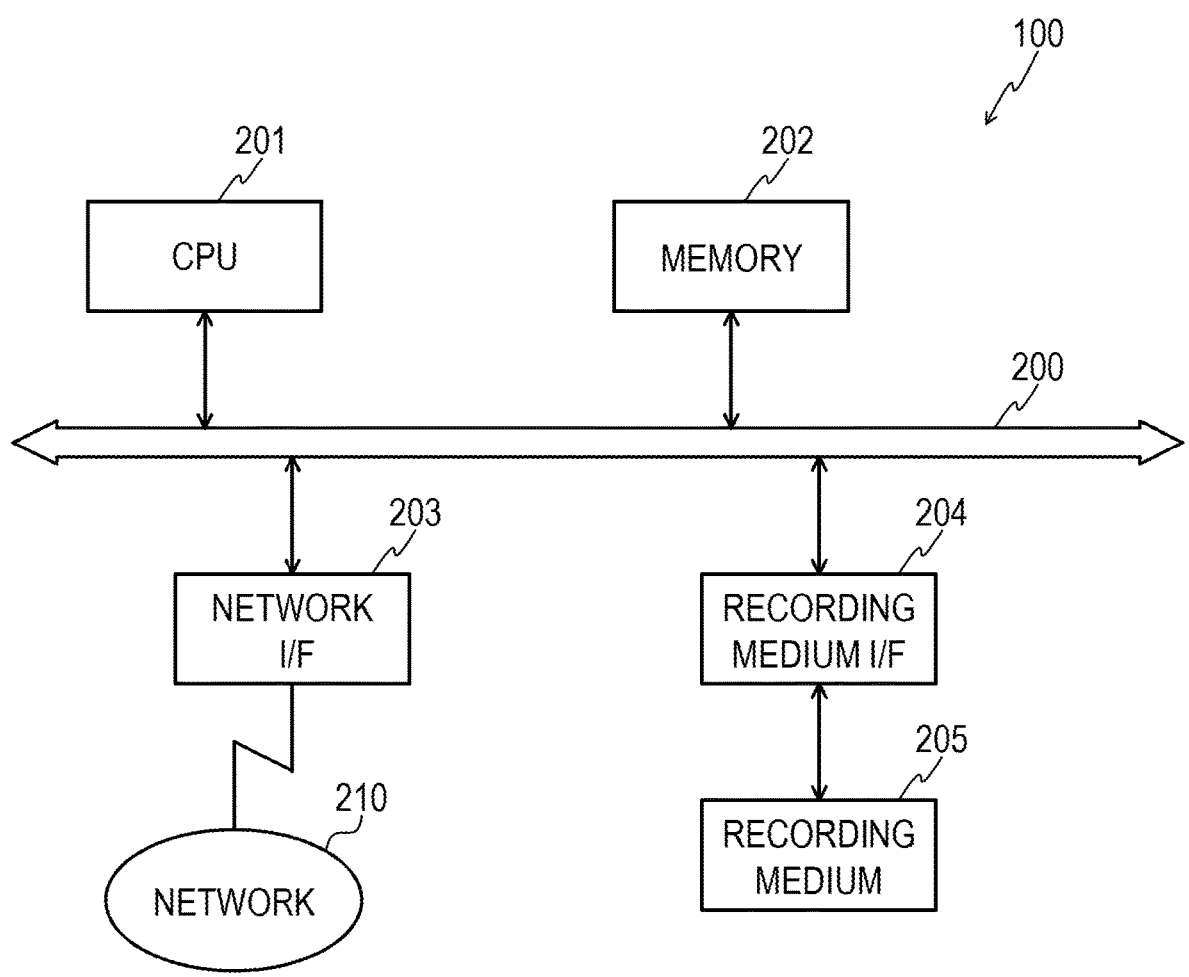
FIG. 2 is a block diagram illustrating a hardware configuration example of a storage control device 100.

FIG. 2 is a block diagram illustrating a hardware configuration example of a storage control device 100. In FIG. 2, the storage control device 100 includes a central processing unit (CPU) 201, a memory 202, a network interface (I/F) 203, a recording medium I/F 204, and a recording medium 205. Further, respective components are connected to each other by a bus 200.

Herein, the CPU 201 takes charge of an overall control of the storage control device 100. The memory 202 includes, for example, a read only memory (ROM), a random access memory (RAM), and a flash ROM. Specifically, for example, the flash ROM or the ROM stores various programs, and the RAM is used as a work area of the CPU 201. The program stored in the memory 202 is loaded to the CPU 201, thereby causing the CPU 201 to execute coded processing. The memory 202 stores, for example, the cache area. The memory 202 stores, for example, a CBE.

The network I/F 203 is connected to a network 210 via a communication line and is connected to another computer via the network 210. In addition, the network I/F 203 serves as an interface between the network 210 and the inside and controls input/output of data from another computer. As the network I/F 203, for example, a modem or a local area network (LAN) adapter may be adopted.

The recording medium I/F 204 controls reading/writing of data with respect to the recording medium 205 under the control of the CPU 201. The recording medium I/F 204 is, for example, a disk drive, a solid state drive (SSD), or a universal serial bus (USB) port. The recording medium 205 is a nonvolatile memory that stores data written under the control of the recording medium I/F 204. The recording medium 205 stores the logical volume. The recording medium 205 is, for example, a disk, a semiconductor memory, or a USB memory. The recording medium 205 may be detachable from the storage control device 100.

In addition to the components, the storage control device 100 may have, for example, a keyboard, a mouse, a display, a printer, a scanner, a microphone, or a speaker. Further, the storage control device 100 may not have the recording medium I/F 204 or the recording medium 205.

(Storage Contents of Start LBA Management Table 300)

Next, with reference to FIG. 3, the storage contents of the start LBA management table 300 will be described. The start LBA management table 300 is implemented by a storage area such as the memory 202 and the recording medium 205 of the storage control device 100 illustrated in FIG. 2, for example.

Figure 3:
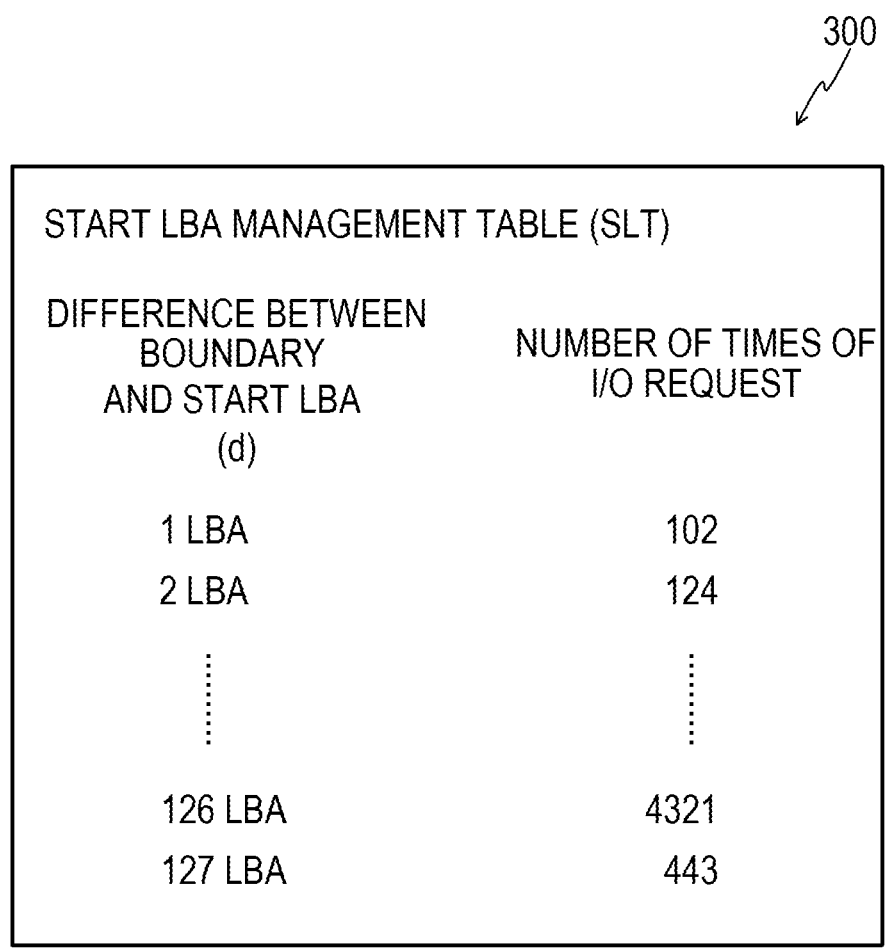
FIG. 3 is an explanatory diagram illustrating an example of storage contents of a start LBA management table 300.

FIG. 3 is an explanatory diagram illustrating an example of storage contents of a start LBA management table 300. As illustrated in FIG. 3, the start LBA management table 300 has fields of a difference d between the boundary and the start LBA, and the number of times of the I/O request. The start LBA management table 300 stores the start LBA management information as a record by setting information in each field for each difference d between the boundary and the start LBA.

A value that may be the difference d between the start LBA indicated by the I/O request and the boundary immediately before the start LBA indicated by the I/O request is set in the field of the difference d between the boundary and the start LBA. The difference d between the boundary and the start LBA is, for example, 1 LBA to 127 LBA. The number of times of the I/O request indicating the start LBA after the different d from the boundary is set in the field of the number of times of the I/O request. The start LBA management table 300 is prepared for each volume. In the following description, the start LBA management table 300 may be referred to as "SLT 300."

(Storage Contents of Volume Alignment Management Table 400)

Next, with reference to FIG. 4, the storage contents of the volume alignment management table 400 will be described. The volume alignment management table 400 is implemented by a storage area such as the memory 202 and the recording medium 205 of the storage control device 100 illustrated in FIG. 2, for example.

Figure 4:
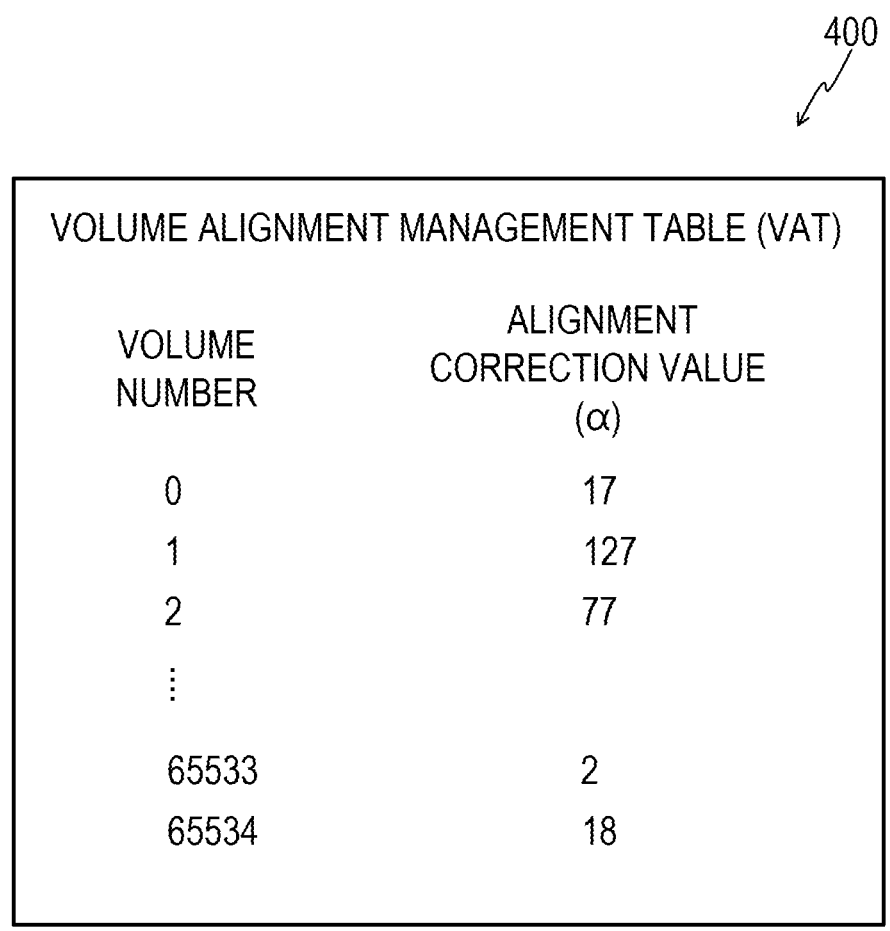
FIG. 4 is an explanatory diagram illustrating an example of storage contents of a volume alignment management table 400.

FIG. 4 is an explanatory diagram illustrating an example of storage contents of a volume alignment management table 400. As illustrated in FIG. 4, the volume alignment management table 400 has fields of a volume number and an alignment correction value $\alpha$. In the volume alignment management table 400, volume alignment management information is stored as the record by configuring information in each field for each volume.

In the field of the volume number, a number for identifying the logical volume is set. In the field of the alignment correction value $\alpha$, the alignment correction value $\alpha$ indicating a movement amount obtained by moving a head of an area used for storing data in the logical volume from the head of the logical volume is set. The alignment correction value $\alpha$ is an offset value with LBA 0 of the start LBA of the area used for storing the data in the logical volume as a reference point. The alignment correction value $\alpha$ indicates that the area behind LBA $\alpha$ is the area used for storing data and indicates that the area of LBA 0 to $\alpha$ is an area not used for storing data. In the following description, the volume alignment management table 400 may be referred to as "VAT 400."

(Hardware Configuration Example of Higher Rank Device)

The hardware configuration example of the higher rank device is similar to the hardware configuration example of the storage control device 100 illustrated in FIG. 2, for example, so that the description thereof is omitted. The memory of the higher rank device may not store the cache area or the CBE. The recording medium of the higher rank device may not store the logical volume.

(Functional Configuration Example of Storage Control Device 100)

Next, a functional configuration example of the storage control device 100 will be described with reference to FIG. 5.

Figure 5:
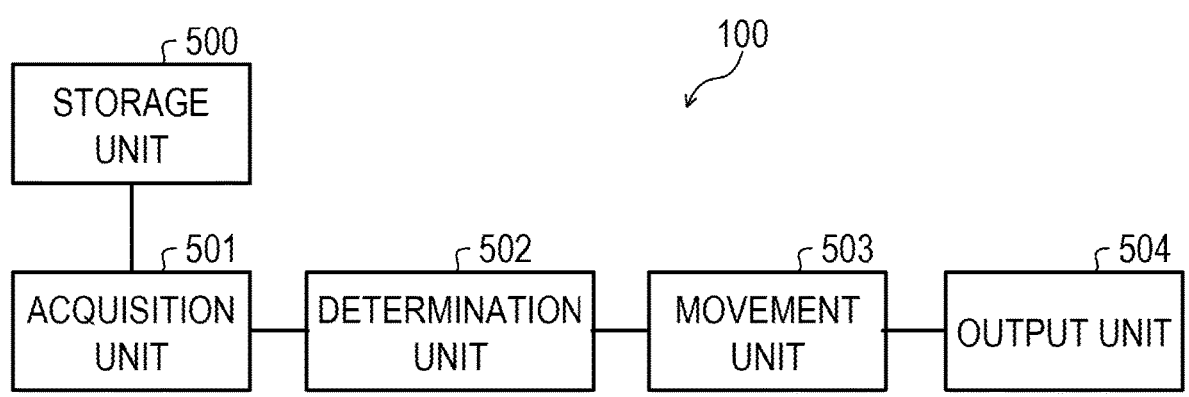
FIG. 5 is a block diagram illustrating a functional configuration example of the storage control device 100.

FIG. 5 is a block diagram illustrating a functional configuration example of the storage control device 100. The storage control device 100 includes a storage unit 500, an acquisition unit 501, a determination unit 502, a movement unit 503, and an output unit 504.

The storage unit 500 is implemented by the storage area such as the memory 202 and the recording medium 205 illustrated in FIG. 2, for example. The acquisition unit 501 to the output unit 504 are functions serving as a control unit. Specifically, the functions of the acquisition unit 501 to the output unit 504 are implemented by causing the CPU 201 to execute a program stored in the storage area such as the memory 202 or the recording medium 205 illustrated in FIG. 2, or by using the network I/F 203. A processing result of each functional unit is stored in the storage area such as the memory 202 or the recording medium 205 illustrated in FIG. 2, for example.

The storage unit 500 stores, for example, a total I/O counter C, an alignment counter C1, a threshold value X, and a threshold value Y used in the determination unit 502 or the movement unit 503. The storage unit 500 stores an SLT 300 illustrated in FIG. 3 or a VAT 400 illustrated in FIG. 4, which is used in the determination unit 502 or the movement unit 503. As a result, the storage unit 500 may enable the determination unit 502 or the movement unit 503 to refer, for example, to the total I/O counter C, the alignment counter C1, the threshold value X, the threshold value Y, the SLT 300 illustrated in FIG. 3, and the VAT 400 illustrated in FIG. 4.

The acquisition unit 501 receives information indicating a start position and an end position of the access to the volume from the higher rank device. The higher rank device is the host device. The volume is the logical volume. The volume may be a RAID group. The volume may be the physical volume. The access is the I/O of data.

The information indicating the start position and the end position of the access is information indicating the start position of the access by the start LBA and the end position of the access by the number of LBAs from the start LBA to the last LBA. Specifically, the information indicating the start position and the end position of the access is the I/O request. For example, the acquisition unit 501 receives the I/O request from the host device. As a result, the acquisition unit 501 may make it possible to specify the access destination area indicated by the past I/O request.

The determination unit 502 determines whether the number of blocks in the cache area, which are used in accordance with the access to the area in the volume from the higher rank device, is reduced by the change in data position of the volume based on one or more pieces of information received by the acquisition unit 501. The block in the cache area used in accordance with the access to the area in the volume from the higher rank device is a block associated with one or more unit areas in the volume including the area. As a result, the determination unit 502 may determine whether it is preferable to change the data position of the volume.

The determination unit 502 may determine whether the number of blocks in the cache area, which are used in accordance with the access to the area within the volume from the higher rank device, is reduced after a predetermined time elapses. For example, the determination unit 502 determines whether the number of blocks in the cache area, which are used in accordance with the I/O request from the host device, is reduced each time a predetermined time elapses from any one timing. As a result, the determination unit 502 determines whether it is preferable to change the data position of the volume based on the I/O request received in a relatively short time to prevent accuracy of the determination from being statistically deteriorated.

The determination unit 502 determines whether the number of blocks in the cache area, which are used in accordance with the access corresponding to the information, is reduced for each piece of received information. For example, the determination unit 502 determines whether the number of blocks in the cache area, which are used in accordance with the I/O request, is reduced each time the I/O request is received. The determination unit 502 increments the total I/O request counter C each time the determination unit 502 receives the I/O request. Whenever the determination unit 502 determines that the number of blocks in the cache area, which are used in accordance with the I/O request, is reduced, the determination unit 502 increments the alignment counter C1.

Next, for each piece of information indicating that the number of blocks is determined to be reduced, the determination unit 502 calculates the number indicating a difference between the start position indicated by the information and the head position of one of the unit areas of the volume and the number of pieces of information for which the number indicating the difference is calculated is calculated for each number indicating the calculated difference. The determination unit 502 calculates a difference d between the start LBA of an I/O request range indicated by the I/O request and the boundary for each I/O request in which the number of blocks is reduced, and increments the number of times of the I/O request of the SLT 300 corresponding to the calculated difference d.

When the number of pieces of information corresponding to the number indicating any one difference is equal to or larger than a predetermined threshold value, the determination unit 502 determines that the number of blocks in the cache area used in accordance with the access to the area in the volume from the higher rank device is reduced. For example, as described below in the embodiment, when the number of times of any one I/O request in the SLT 300>the threshold value X, the determination unit 502 determines that the number of blocks in the cache area used in accordance with the I/O request from the host device is reduced in the future. As a result, the determination unit 502 may determine whether the number of I/O requests determined to reduce the number of blocks used in the cache area to be used in the future is relatively large as a result of changing the position of the data in the volume.

When a ratio of the number of pieces of information indicating that the number of blocks is determined to be reduced with respect to the number of pieces of received information is equal to or larger than the predetermined threshold value, the determination unit 502 determines that the number of blocks in the cache area, which are used in accordance with the access to the area in the volume from the higher rank device, is reduced. As described below with the embodiment, in the case of the alignment counter C1/the total I/O request counter C>the threshold value Y, the determination unit 502 determines that the number of blocks in the cache area used in accordance with the I/O request from the host device is reduced in the future. As a result, the storage control device 100 may suppress the risk of an increase in the number of blocks in the cache area to be used.

The determination unit 502 may calculate an index value indicating a variation size of the number indicating the calculated difference. When the variation size of the number indicating the calculated difference is equal to or larger than a predetermined value based on the calculated index value, the determination unit 502 determines that the number of blocks in the cache area is reduced. As a result, the determination unit 502 may determine whether a possibility that the performance of the I/O request corresponding to another difference will be deteriorated is relatively large when the variation of the number indicating the difference is small and the position of the data in the volume is changed based on any one difference.

When the determination unit 502 determines that the number of blocks in the cache area used in accordance with the access to the area in the volume from the higher rank device is reduced, the movement unit 503 changes the position of the data in the volume. After changing the position of the data in the volume, the movement unit 503 converts the information received from the higher rank device according to a change amount. When the determination unit 502 determines that the number of blocks in the cache area used in accordance with the access to the area in the volume from the higher rank device is not reduced, the movement unit 503 does not change the position of the data in the volume.

For example, when it is determined that the number of blocks is reduced, the movement unit 503 duplicates volume data to a position from the head of a second volume different from the volume corresponding to a position shifted from the position from the head of the volume of the corresponding data by a predetermined amount. After receiving the information indicating the start position and the end position of the access to the volume from the higher rank device after duplication, the movement unit 503 has the position of the second volume as an access destination, which corresponds to positions shifted from the start position and the end position by predetermined amounts. As a result, the movement unit 503 may make the volume of a duplication source as the access destination from the host device during duplication to prevent processing related to the I/O request from the host device from being stopped during the duplication.

For example, when the determination unit 502 determines that the number of blocks in the cache area used in accordance with the access to the area in the volume from the higher rank device is reduced, the movement unit 503 shifts the position of the data in the volume by a predetermined amount. After receiving the information indicating the start position and the end position of the access to the volume from the higher rank device after shifting the position of the data in the volume by the predetermined amount, the movement unit 503 shifts the start position and the end position by the predetermined amounts.

The movement unit 503 sets a number indicating a difference corresponding to the relatively large number of pieces of information among the calculated number of pieces of information to a predetermined amount. For example, the movement unit 503 sets a difference d in which a field value of number of times of the I/O request is largest to the alignment correction value $\alpha$ based on the SLT 300. As a result, the movement unit 503 may easily increase the number of I/O requests in which the number of blocks in the cache area, which are used in the future is reduced by changing the position of the volume data.

The output unit 504 outputs the processing result of each functional unit. An output format is, for example, display on a display, print-out to a printer, transmission to an external device by the network I/F 203, or storage in the storage area such as the memory 202 or the recording medium 205. As a result, the output unit 504 may cause a user to determine, for example, a state of the volume, or a movement state of the volume data.

Embodiments

Next, embodiments will be described with reference to FIGS. 6 to 8.

Figure 6:
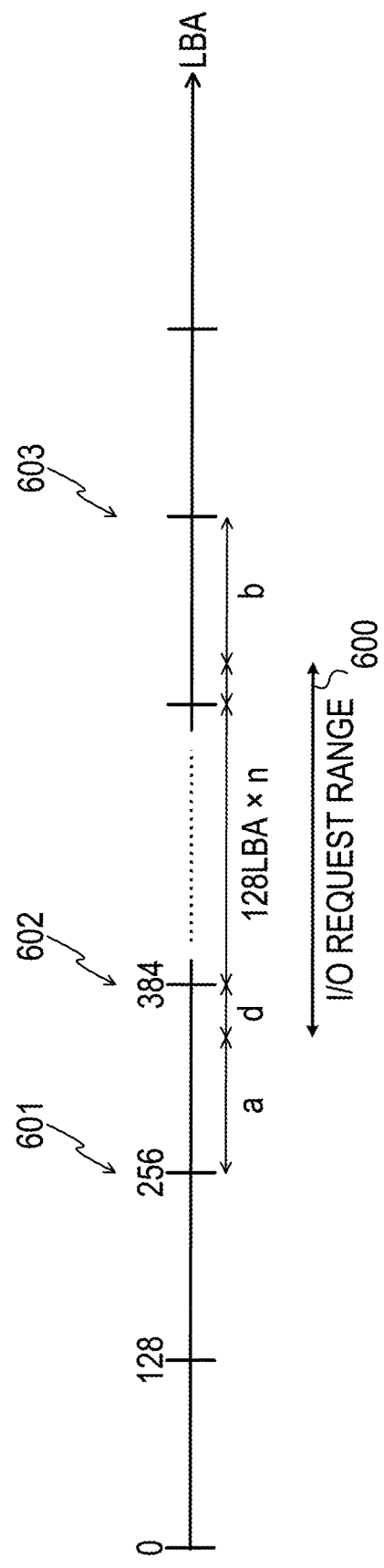
FIG. 6 is an explanatory diagram (part 1) illustrating an embodiment.
Figure 7:
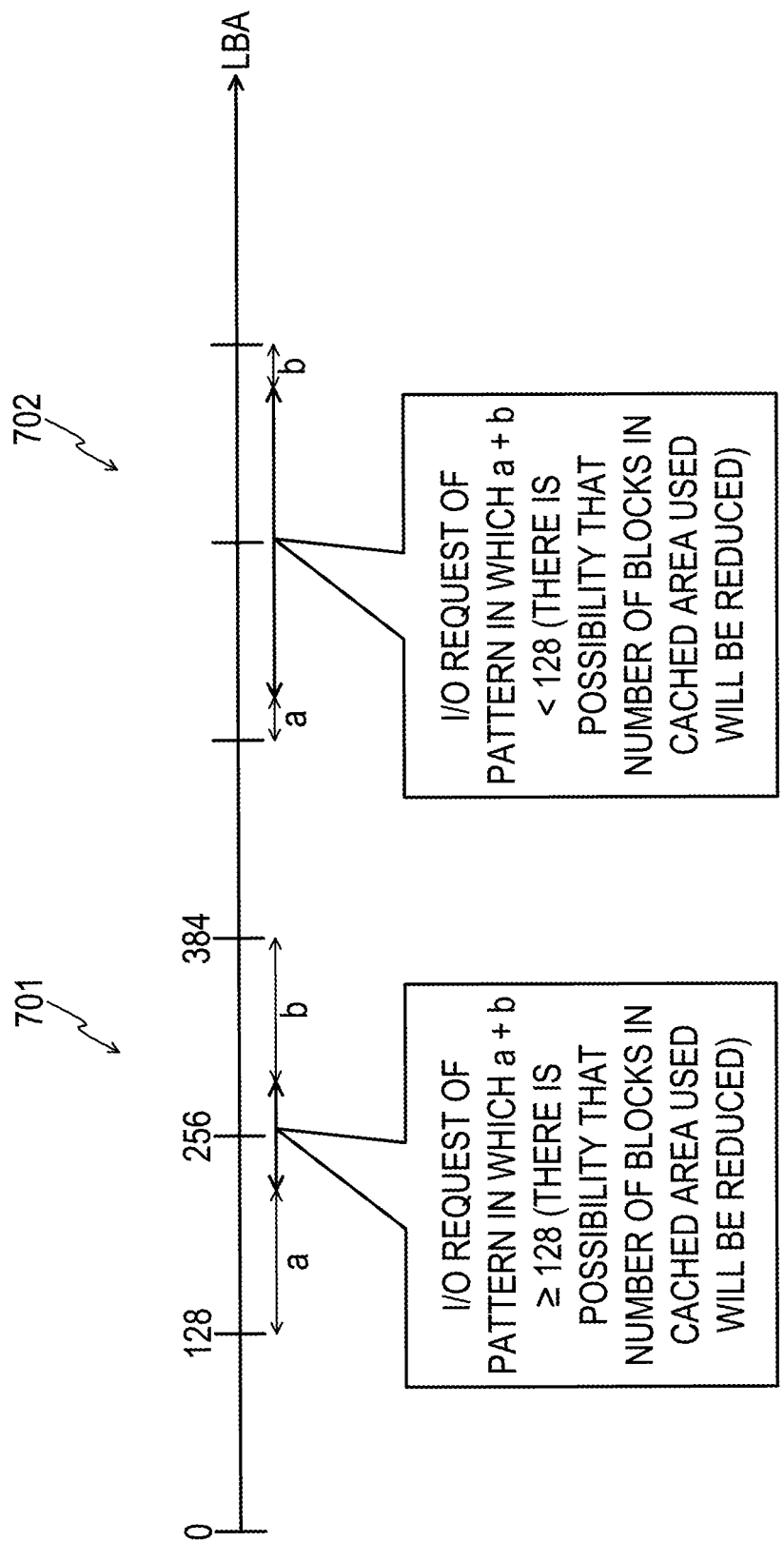
FIG. 7 is an explanatory diagram (part 2) illustrating an embodiment.
Figure 8:
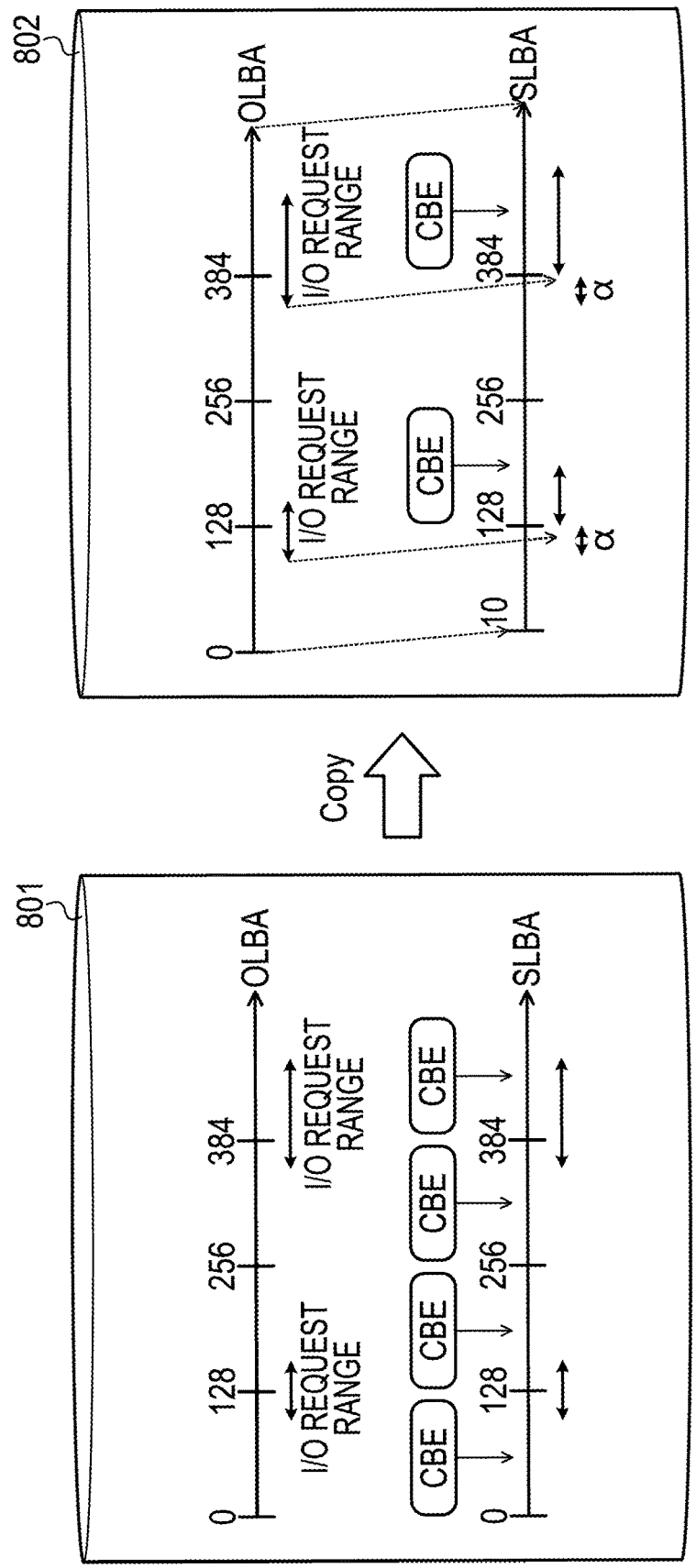
FIG. 8 is an explanatory diagram (part 3) illustrating an embodiment.

FIGS. 6 to 8 are explanatory diagrams illustrating the embodiments. As illustrated in FIG. 6, in the embodiment, the number of LBAs from the head of an I/O request range 600 indicated by the I/O request up to a boundary 601 before the head of the I/O request range 600 is set to "a."

The number of LBAs from the end of the I/O request range 600 indicated by the I/O request up to a boundary 603 after the end of the I/O request range 600 is set to "b." Further, the number of LBAs from the head of the I/O request range 600 indicated by the I/O request up to a boundary 602 after the head of the I/O request range 600 is set to "d." Next, description of FIG. 7 will be made.

As illustrated in FIG. 7, the I/O request includes a pattern 701 in which the number of blocks in the cache area to be used may be reduced by changing the position of the data in the logical volume and a pattern 702 in which the number of blocks in the cache area to be used may not be reduced.

The pattern 701 is, for example, a pattern in which a+b≥128. Specifically, when the position of the data in the logical volume is changed, the pattern of a+b≥128 becomes either a case where the number of blocks in the cache area to be used is reduced or a case where the number of blocks in the cache area to be used is not changed.

Meanwhile, the pattern 702 is, for example, a pattern in which a+b<128. Specifically when the position of the data in the logical volume is changed, the pattern of a+b<128 becomes either a case where the number of blocks in the cache area to be used is not reduced, but increased or the case where the number of blocks in the cache area to be used is not changed.

As a result, when the number of patterns in which a+b≥128 is larger than the number of patterns in which a+b<128 among the past I/O requests, it is determined that it is preferable to change the position of the data in the logical volume. Next, description of FIG. 8 will be made.

In FIG. 8, the storage control device 100 prepares the SLT 300 to learn a trend of the I/O request. The storage control device 100 prepares the VAT 400 in order to manage the alignment correction value $\alpha$. In order to determine whether to change the position of the data in the logical volume, the storage control device 100 prepares the total I/O request counter C for counting the total number of I/O requests and the alignment counter C1 for counting the number of times of the I/O request of the pattern in which a+b≥128. The storage control device 100 prepares the threshold value X and the threshold value Y in order to determine whether to change the position of the data in the logical volume.

The storage control device 100 receives the I/O request from the host device. Every time the I/O request is received, the storage control device 100 determines whether the received I/O request is an I/O request with a pattern in which a+b≥128, based on the start LBA and the last LBA indicated by the received I/O request.

Hereinafter, the storage control device 100 increments the total I/O request counter C each time the storage control device 100 receives the I/O request. The storage control device 100 increments the alignment counter C1 every time it is determined that the I/O request is the I/O request of the pattern in which a+b≥128.

When the storage control device 100 determines that the I/O request is the I/O request of the pattern in which a+b≥128, the storage control device 100 further calculates the difference d between the start LBA and the boundary by d=128−a. The storage control device 100 increments the number of times of the I/O request of the SLT 300 corresponding to the calculated difference d.

The storage control device 100 receives the I/O request and further determines whether first to third conditions illustrated below are satisfied whenever determining whether the I/O request is the I/O request of the pattern in which a+b≥128. When any one condition is not satisfied, the storage control device 100 waits for a next I/O request.

The first condition is that a predetermined time elapses. The first condition is a condition for preventing from determining whether it is preferable to change the position of the data in the logical volume based on the I/O request received in a relatively short time. The first condition is, for example, a condition for preventing the precision of the determination from being statistically deteriorated by determining whether it is preferable to change the position of the data in the logical volume based on the I/O request received in the relatively short time.

The second condition is a case where the number of times of any one I/O request in the SLT 300>the threshold value X. The second condition indicates that there is the difference d in which the number of times of the I/O request of the pattern in which a+b≥128 is larger than the threshold value X. Therefore, the second condition is a condition for determining that the number of I/O requests in which the number of blocks in the cache area to be used is reduced becomes relatively large in the future when the position of the data in the logical volume is changed.

The third condition is a case where the alignment counter C1/the total I/O request counter C>the threshold value Y. Herein, in the I/O request of the pattern in which a+b≥128, the number of blocks in the cache area to be used does not increase regardless of the change amount to change the position of the data in the logical volume. When the alignment counter C1/the total I/O request counter C is large to some extent, the ratio of the I/O request of the pattern in which a+b≥128 is large. As a result, the third condition is a condition for determining that when the alignment counter C1/the total I/O request counter C is large to some extent, the risk of increasing the number of blocks in the cache area to be used may be suppressed.

When the first to third conditions are satisfied, the storage control device 100 sets the difference d in which the number of times of the I/O request in the SLT 300 is the largest as the alignment correction value α. The storage control device 100 changes the position of the data in the logical volume based on the alignment correction value α.

Herein, an address of the logical volume recognized by the host device is defined as OLBA and the address of the logical volume recognized by the storage control device 100 is defined as SLBA. The storage control device 100 shifts the SLBA of the logical volume from the OLBA by an amount corresponding to the alignment correction value α.

For example, the storage control device 100 generates another logical volume different from the logical volume corresponding to the logical volume in which the SLBA is shifted from the OLBA by the amount corresponding to the alignment correction value α. As a result, the storage control device 100 implements the change of the position of the data in the logical volume recognized by the host device.

Specifically, the storage control device 100 duplicates data of a logical volume 801 to another logical volume 802 in which the SLBA is shifted from the OLBA by the amount corresponding to the alignment correction value α. In addition, the storage control device 100 changes the access destination from the host device from the logical volume 801 of the duplication source to the logical volume 802 of the duplication destination. After duplication, the storage control device 100 updates the alignment correction value α corresponding to the logical volume 802 of the duplication destination of the VAT 400. After duplication, the storage control device 100 deletes the logical volume 801 of the duplication source.

As a result, the storage control device 100 may change the position of the data in the logical volume 801 recognized by the host device. Further, since the storage control device 100 duplicates the data in the logical volume 801 to another logical volume 802, the logical volume 801 of the duplication source may be used as the access destination from the host device during the duplication. In addition, the storage control device 100 may prevent processing related to the I/O request from the host device from being stopped during the duplication.

The storage control device 100 initializes the SLT 300, the alignment counter C 1, and the total I/O request counter C. Initialization is, for example, setting 0.

When there is the I/O request to the logical volume 802 of the duplication destination from the host device, the storage control device 100 converts the head OLBA indicated by the I/O request into the head SLBA by SLBA=OLBA+α, based on the VAT 400. As a result, the storage control device 100 implements an I/O for the logical volume 802 of the duplication destination.

Therefore, the storage control device 100 may reduce the number of blocks in the cache area, which are used according to the I/O request from the host device in the future. For example, in the logical volume 801, the storage control device 100 allocates four CBEs according to the I/O request of predetermined data, but in the logical volume 802, may allocate two CBEs according to the I/O request of the same data. As described above, in the future, the number of blocks in the cache area, which are used according to the I/O request from the host device, is reduced.

As a result, the storage control device 100 may make it difficult for the blocks in the cache area to be exhausted. In addition, the storage control device 100 may make it difficult for the waiting for the access to occur, thereby suppressing the deterioration in access performance. Further, since the storage control device 100 attempts to reduce the number of blocks in the cache area, which are used in response to the future I/O request, the storage control device 100 may make it easy to efficiently execute the future I/O.

After duplicating the data of the logical volume 801 to the logical volume 802, the storage control device 100 may reflect the data stored in the block in the cache area onto the logical volume 802 or delete the data. For example, when there is data of which write-back is not completed in the block in the cache area, the storage control device 100 reflects the data onto the logical volume 802 after duplication. For example, when there is the data of which write-back is completed in the block in the cache area, the storage control device 100 may delete data.

For example, before duplicating the data of the logical volume 801 to the logical volume 802, when there is the data of which write-back is not completed in the block in the cache area, the storage control device 100 may reflect the data to the logical volume 801. In addition, the storage control device 100 may duplicate the data of the logical volume 801 after reflection to the logical volume 802.

(Example of I/O Processing Procedure)

Next, an example of the I/O processing procedure will be described with reference to FIG. 9.

Figure 9:
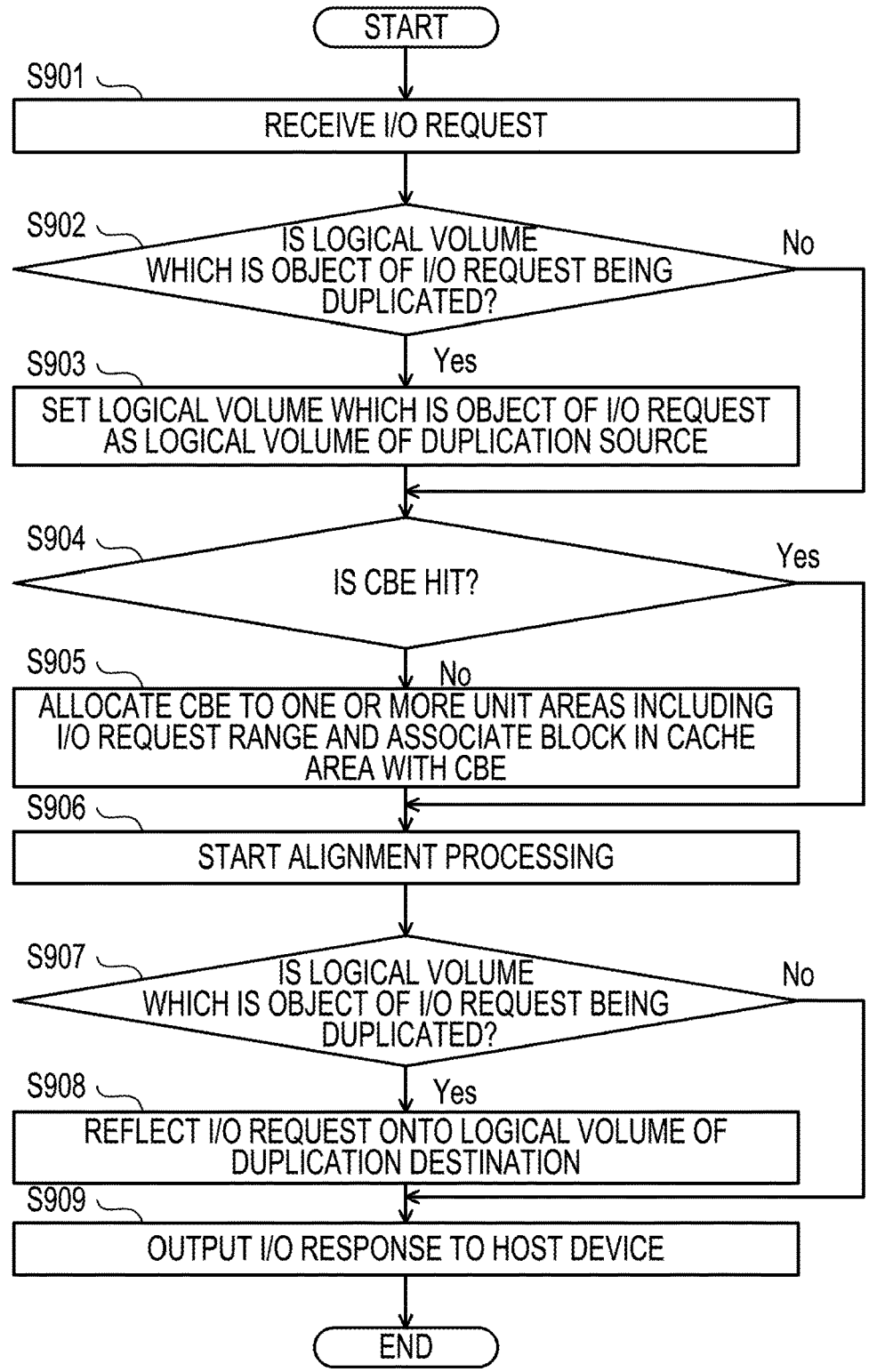
FIG. 9 is a flowchart illustrating an example of an I/O processing procedure.

FIG. 9 is a flowchart illustrating an example of an I/O processing procedure. In FIG. 9, the storage control device 100 receives the I/O request (step S901).

Next, the storage control device 100 determines whether the logical volume that is an object of the I/O request is being duplicated by alignment processing to be described below in FIG. 10 (step S902). Here, when it is determined that the logical volume is not being duplicated (step S902: No), the storage control device 100 proceeds to processing of step S904.

Meanwhile, when it is determined that the logical volume is being duplicated (step S902: Yes), the storage control device 100 configures the logical volume which is the object of the I/O request in the logical volume of the duplication source (step S903). Then, the storage control device 100 proceeds to the processing of step S904.

In step S904, the storage control device 100 determines whether the CBE is hit (step S904). Herein, when it is determined that the CBE is hit (step S904: Yes), the storage control device 100 proceeds to processing of step S906.

Meanwhile, when it is determined that the CBE is not hit (step S904: No), the storage control device 100 allocates the CBE to one or more unit areas including the I/O request range and associates the blocks in the cache area with the CBE (step S905). Then, the storage control device 100 proceeds to processing of step S906.

In step S906, the storage control device 100 starts the alignment processing to be described below in FIG. 10 (step S906). Next, the storage control device 100 determines whether the logical volume that is the object of the I/O request is being duplicated by the alignment processing to be described below in FIG. 10 (step S907). Herein, when it is determined that the logical volume is not being duplicated (step S907: No), the storage control device 100 proceeds to processing of step S909.

Meanwhile, when it is determined that the logical volume is being duplicated (step S907: Yes), the storage control device 100 reflects the I/O request onto the logical volume of the duplication destination (step S908). Then, the storage control device 100 proceeds to processing of step S909.

In step S909, the storage control device 100 generates an I/O response and outputs the generated I/O response to the host device (step S909). Then, the storage control device 100 ends the I/O processing. Therefore, the storage control device 100 may reduce the number of blocks in the cache area, which are used according to the I/O request in the future.

(Example of Alignment Processing Procedure)

Next, an example of the alignment processing procedure will be described with reference to FIG. 10.

Figure 10:
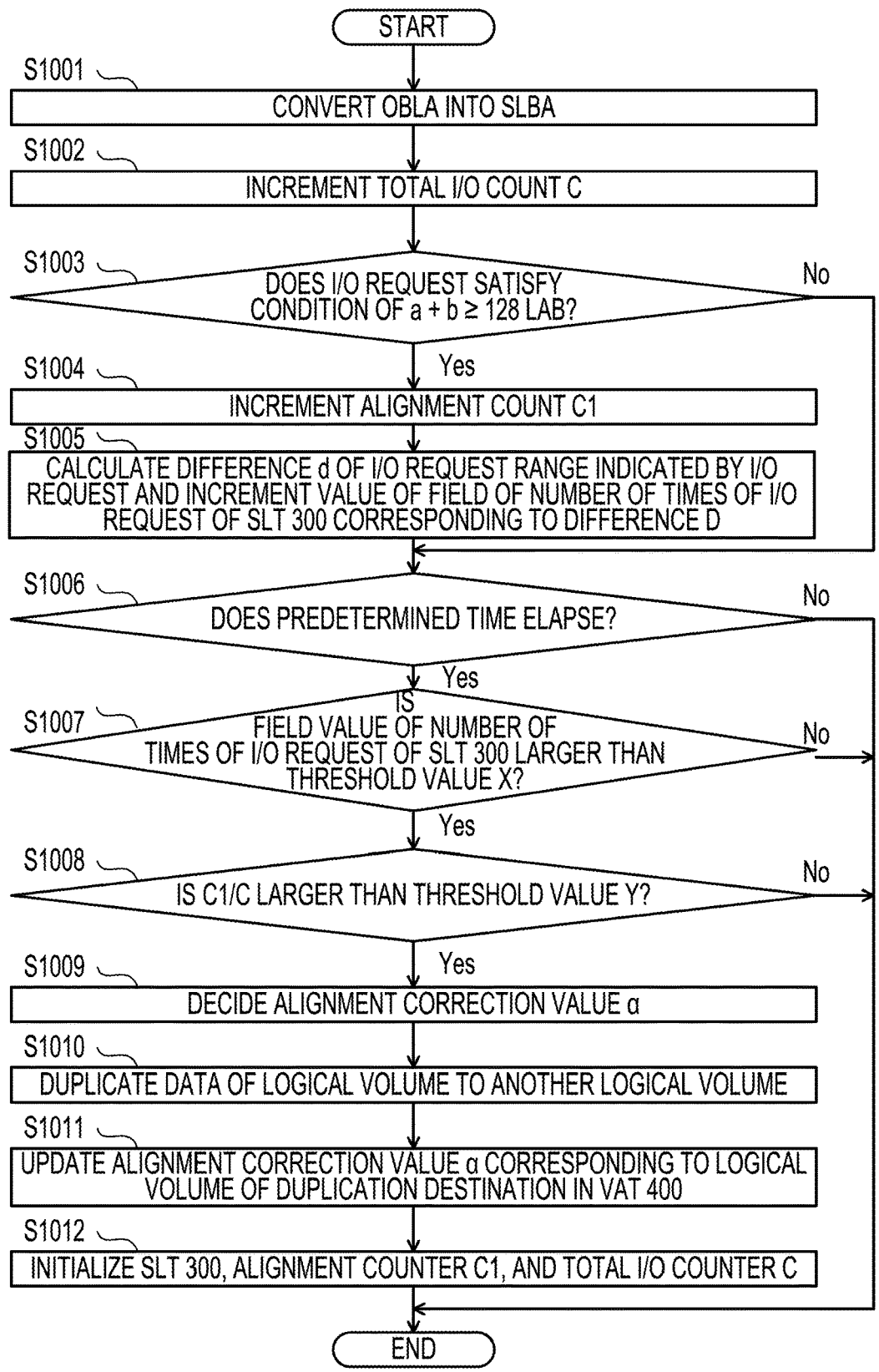
FIG. 10 is a flowchart illustrating an example of an alignment processing procedure.

FIG. 10 is a flowchart illustrating an example of an alignment processing procedure. In FIG. 10, the storage control device 100 refers to the VAT 400 and converts the OLBA for the I/O request range indicated by the I/O request into the SLBA (step S1001).

Next, the storage control device 100 increments the total I/O counter C (step S1002). Then, the storage control device 100 determines whether the I/O request satisfies a condition of a+b≥128 LBA (step S1003). Herein, when it is determined that the corresponding I/O request does not satisfy the condition of a+b≥128 LBA (step S1003: No), the storage control device 100 proceeds to processing of step S1006.

Meanwhile, when it is determined that the I/O request satisfies the condition of a+b≥128 LBA (step S1003: Yes), the storage control device 100 increments the alignment counter C1 (step S1004). Next, the storage control device 100 calculates the difference d of the I/O request range indicated by the I/O request and increments the value of the field of the number of times of the I/O request of the SLT 300 corresponding to the difference d (step S1005). Then, the storage control device 100 proceeds to processing of step S1006.

In step S1006, the storage control device 100 determines whether a predetermined time elapses (step S1006). Herein, when it is determined that the predetermined time does not elapse (step S1006: No), the storage control device 100 ends the alignment processing.

Meanwhile, when it is determined that the predetermined time elapses (step S1006: Yes), the storage control device 100 determines whether the value of the field of the number of times of the I/O request of the SLT 300 is larger than a threshold value X (step S1007). Herein, when it is determined that the value of the field is equal to or smaller than the threshold value X (step S1007: No), the storage control device 100 ends the alignment processing.

Meanwhile, when it is determined that the value of the field is larger than the threshold value X (step S1007: Yes), the storage control device 100 determines whether the alignment counter C1/the total I/O counter C is larger than a threshold value Y (step S1008). Herein, when it is determined that the value of the field is equal to or smaller than threshold value Y (step S1008: No), the storage control device 100 ends the alignment processing.

Meanwhile, when it is determined that the value of the field is larger than threshold value Y (step S1008: Yes), the storage control device 100 decides the alignment correction value α by referring to the SLT 300 (step S1009). Next, the storage control device 100 duplicates the data of the logical volume to another logical volume based on the alignment correction value α (step S1010). Then, the storage control device 100 updates the alignment correction value α corresponding to the logical volume of the duplication destination in the VAT 400 (step S1011).

Next, the storage control device 100 initializes the SLT 300, the alignment counter C1, and the total I/O counter C (step S1012). Then, the storage control device 100 ends the alignment processing. As a result, the storage control device 100 may duplicate the data of the logical volume to another logical volume.

As described above, according to the storage control device 100, the I/O request of the logical volume 110 from the host device may be received. The storage control device 100 may determine whether the number of blocks in the cache area, which are used according to the I/O request in the future, is reduced by changing the position of the data in the logical volume 110 based on one or more received I/O requests. When the storage control device 100 determines that the number of blocks is reduced, the storage control device 100 may change the position of the data in the logical volume 110. Therefore, the storage control device 100 may reduce the number of blocks in the cache area, which are secured according to the I/O request from the host device.

When the storage control device 100 determines that the number of blocks is reduced, the storage control device 100 may duplicate the data of the logical volume 110 to the position in the second logical volume, which corresponds to a position shifted from position in the logical volume 100 by a predetermined amount. When the storage control device 100 receives the I/O request for the logical volume 110 from the host device after duplication, the storage control device 100 may set the position of the second logical volume, which corresponds to positions shifted from the start LBA and the final LBA indicated by the I/O request by a predetermined amount as the access destination. As a result, the storage control device 100 may set the logical volume 110 of the duplication source as the access destination from the host device during the duplication to prevent processing related to the I/O request from the host device from being stopped during the duplication.

When the storage control device 100 determines that the number of blocks is reduced, the storage control device 100 may shift the position of the data in the logical volume 110 by a predetermined amount. When the storage control device 100 receives the I/O request for the logical volume 110 from the host device after shifting the position of the data in the logical volume 110 by the predetermined amount, the storage control device 100 may shift the start LBA and the final LBA indicated by the I/O request by a predetermined amount. As a result, the storage control device 100 may implement the I/O for the logical volume 110 after shifting the position of the data of the logical volume 110 by the predetermined amount.

The storage control device 100 may determine whether the number of blocks in the cache area which are used in accordance with the I/O request, is reduced each time the I/O request which is received. When the storage control device 100 may calculate the difference d between the start LBA indicated by the corresponding I/O request and any one boundary in the logical volume 110 for each I/O request in which the number of blocks is determined to be reduced. The storage control device 100 may calculate the number of I/O requests in which the corresponding difference d is calculated for each difference d. The storage control device 100 may set a difference d corresponding to a relatively large I/O request number among the calculated I/O request numbers as a predetermined amount. Therefore, the storage control device 100 may efficiently reduce the number of blocks in the cache area, which are used according to the I/O request for the logical volume 110 in the future.

The storage control device 100 may determine whether the number of blocks in the cache area, which are used in accordance with the I/O request for the logical volume 110 from the host device, is reduced after a predetermined time elapses. As a result, the storage control device 100 determines whether it is preferable to change the data position of the logical volume 110 based on the I/O request received in a relatively short time to prevent accuracy of the determination from being statistically deteriorated.

When the number of I/O requests corresponding to any one difference d is equal to or larger than a predetermined threshold, the storage control device 100 may determine that the number of blocks in the cache area used according to the I/O request from the host device in the future is reduced. As a result, the storage control device 100 may determine whether the number of I/O requests determined to reduce the number of blocks in the cache area used in the future is relatively large as a result of changing the position of the data in the logical volume 110. It is possible to attempt to enhance the accuracy of determining whether the number of blocks in the cache area used in accordance with the I/O request for the logical volume 110 from the host device is reduced.

The storage control device 100 may calculate the ratio of the number of I/O requests in which the number of blocks is determined to be reduced to the number of received I/O requests. The storage control device 100 may determine that the number of blocks in the cache area, which are used in accordance with the I/O request for the logical volume 110 from the host device in the future, is reduced when the calculated ratio is equal to or larger than a predetermined threshold value. As a result, the storage control device 100 may suppress a risk of an increase in the number of blocks in the cache area to be used.

The storage control device 100 may calculate an index value indicating a variation size of the calculated difference d. The storage control device 100 may determine that when the variation size of the calculated difference d is equal to or larger than a predetermined value, the number of blocks in the cache area to be used in the future is reduced, based on the calculated index value. Therefore, the storage control device 100 may efficiently reduce the number of blocks in the cache area, which are used according to the I/O request for the logical volume 110 in the future.

When the storage control device 100 determines that the number of blocks is not reduced, the storage control device 100 may not change the position of the data in the logical volume 110. As a result, in a case where the number of blocks in the cache area, which are used in the future, increases when the storage control device 100 changes the position of the data in the logical volume 110, the storage control device 100 may not change the position of the data in the logical volume 110.

The storage control method described in the embodiment may be implemented by executing a previously prepared program by means of a computer such as a personal computer or a workstation. The storage control program described in the embodiment is recorded on a computer readable recording medium such as a hard disk, a flexible disk, a CD-ROM, an MO, or a DVD and is executed by being read from the recording medium by the computer. Further, the storage control program described in the embodiment may be distributed via a network such as the Internet.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. A storage control device, comprising:
a memory; and
a processor coupled to the memory and the processor configured to:
receive first access information that indicates a first start position and a first end position of an access area to be used in a first volume according to an access from a higher rank device;
determine, based on one or more pieces of received access information that includes the first access information, whether a number of blocks to be used in a cache area that corresponds to the access area in the first volume to be used according to the access from the higher rank device can be reduced when a position of data is changed in the first volume, the number of blocks in the cache area corresponding to one or more unit areas that includes the access area in the first volume; and
change the position of data in the first volume upon determining that the number of the blocks to be used in the cache area that corresponds to the access area in the first volume to be used according to the access from the higher rank device can be reduced when the position of the data is changed in the first volume.

2. The storage control device according to claim 1, wherein the processor is configured to: duplicate, upon determining that the number of the blocks to be used in the cache area that corresponds to the access area in the first volume to be used according to the access from the higher rank device can be reduced, the data of the first volume to a second volume different from the first volume at a position shifted from the position of the data in the first volume by a predetermined amount; and, after the duplication, access a second access area in the second volume upon receiving the first access information that indicates the first start position and the first end position of the access area in the first volume, the second access area having a second start position and a second end position in the second volume respectively obtained by shifting the first start position and the first end position by the predetermined amount.

3. The storage control device according to claim 1, wherein the processor is configured to: shift, upon determining that the number of the blocks to be used in the cache area that corresponds to the access area in the first volume to be used according to the access from the higher rank device can be reduced, the position of the data in the first volume by a predetermined amount: and, after shifting the position of the data, access a second access area upon receiving the first access information that indicates the first start position and the first end position of the access area in the first volume, the second access area having a second start position and a second end position respectively obtained by shifting the first start position and the first end position by the predetermined amount.

4. The storage control device according to claim 2, wherein the processor is configured to: determine, for each piece of access information received within a predetermined time period, whether the number of the blocks to be used in the cache area can be reduced when the position of the data is changed in the first volume; calculate, upon determining that the number of the blocks to be used in the cache area can be reduced, a difference between the start position indicated by a relevant access information and a head position of any one unit area in the first volume; increment a vote for the calculated difference by one; determine a popular difference having a largest vote among the votes for the calculated differences; and set the popular difference as the predetermined amount.

5. The storage control device according to claim 4, wherein the processor is configured to: determine, after the predetermined time period elapses, whether the number of the blocks to be used in the cache area can be reduced when the position of data is changed in the first volume.

6. The storage control device according to claim 4, wherein the processor is configured to: determine, when the largest vote is equal to or larger than a predetermined threshold value, that the number of the blocks to be used in the cache area can be reduced when the position of data is changed in the first volume.

7. The storage control device according to claim 4, wherein the processor is configured to: count a number of pieces of access information received within the predetermined time period; calculate a ratio of a sum of the votes for the calculated differences to the number of the pieces of access information; and determine, when the ratio is equal to or larger than a predetermined threshold value, that the number of the blocks to be used in the cache area can be reduced when the position of data is changed in the first volume.

8. The storage control device according to claim 4, wherein the processor is configured to: calculate an index value that indicates a degree of a variation between the calculated differences; and determine, when the index value is equal to or larger than a predetermined threshold value, that the number of the blocks to be used in the cache area can be reduced when the position of data is changed in the first volume.

9. The storage control device according to claim 1, wherein the processor is configured to: withhold the change of the position of the data in the first volume upon determining that the number of the blocks to be used in the cache area is not reduced when the position of the data is changed in the first volume.

10. A non-transitory computer-readable recording medium having stored therein a program that causes a computer to execute a process, the process comprising:
    receiving first access information that indicates a first start position and a first end position of an access area to be used in a first volume according to an access from a higher rank device;
    determining, based on one or more pieces of received access information that includes the first access information, whether a number of blocks to be used in a cache area that corresponds to the access area in the first volume to be used according to the access from the higher rank device can be reduced when a position of data is changed in the first volume, the number of blocks in the cache area corresponding to one or more unit areas that includes the access area in the first volume; and
    changing the position of data in the first volume upon determining that the number of the blocks to be used in the cache area that corresponds to the access area in the first volume to be used according to the access from the higher rank device can be reduced when the position of the data is changed in the first volume.

* * * * *